(12) United States Patent
Thiagarajan et al.

(10) Patent No.: US 11,070,453 B2
(45) Date of Patent: Jul. 20, 2021

(54) PROVIDING NETWORK TRAFFIC ENDPOINT RECOMMENDATION BASED ON NETWORK TRAFFIC DATA ANALYSIS

(71) Applicant: Microsoft Technology Licensing, LLC, Redmond, WA (US)

(72) Inventors: Prabu Raj Thiagarajan, Redmond, WA (US); Hrishikesh Devadatta Kulkarni, Seattle, WA (US); Debarghya Mandal, Woodinville, WA (US); Dilip Kurian Lukose, Issaquah, WA (US); Vijay Tinnanur, Redmond, WA (US); Yung-Chih Chen, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 208 days.

(21) Appl. No.: 16/131,021

(22) Filed: Sep. 13, 2018

(65) Prior Publication Data
US 2020/0092181 A1 Mar. 19, 2020

(51) Int. Cl.
*H04L 12/26* (2006.01)
*G06N 20/00* (2019.01)
*G06F 16/29* (2019.01)

(52) U.S. Cl.
CPC .......... *H04L 43/062* (2013.01); *G06F 16/29* (2019.01); *G06N 20/00* (2019.01); *H04L 43/04* (2013.01)

(58) Field of Classification Search
CPC ......... G06F 16/29; G06N 20/00; H04L 43/04; H04L 43/062; H04L 45/306; H04L 45/123; H04L 45/121; H04L 45/08
See application file for complete search history.

(56) References Cited

U.S. PATENT DOCUMENTS 7,054,931 B1    5/2006  Candan et al.
8,903,995 B1 *  12/2014 Basak .................. H04L 43/08
                                            709/224
9,602,377 B2 *  3/2017  Agarwal ............. H04L 43/0864
(Continued)

OTHER PUBLICATIONS

"International Search Report and Written Opinion Issued in PCT Application No. PCT/US2019/038834", dated Aug. 29, 2019, 16 Pages.

*Primary Examiner* — Philip C Lee
(74) *Attorney, Agent, or Firm* — Newport IP, LLC; Han Gim

(57) ABSTRACT

The disclosure herein describes establishing an endpoint within a network for a customer to reduce latency of the customer's network. Latency data associated with accessing a first endpoint within a network by end user devices from a plurality of geographic regions is collected, wherein the end user devices are associated with a plurality of customers. Performance scores for the geographic regions are calculated based on the latency data. A subset of the performance scores of one of the plurality of customers is selected. A second endpoint is identified within the network for the one of the plurality of customers based on the selected performance scores. The second endpoint is established for the one of the plurality customers for network traffic originating from the one or more of the geographic regions to reduce latency. The analysis of the network traffic data for customers improves network performance.

20 Claims, 5 Drawing Sheets

(56) References Cited

U.S. PATENT DOCUMENTS

| | | | |
|---|---|---|---|
| 10,127,234 B1* | 11/2018 | Krishnan | G06F 16/1847 |
| 2002/0049687 A1 | 4/2002 | Helsper et al. | |
| 2002/0105926 A1* | 8/2002 | Famolari | H04L 12/189 |
| | | | 370/331 |
| 2014/0258523 A1* | 9/2014 | Kazerani | H04L 43/12 |
| | | | 709/224 |
| 2016/0174081 A1* | 6/2016 | Lau | H04L 41/5067 |
| | | | 455/457 |
| 2018/0278496 A1* | 9/2018 | Kulshreshtha | H04L 43/04 |
| 2019/0182120 A1* | 6/2019 | Coccia | G06Q 10/06 |
| 2019/0379592 A1* | 12/2019 | Samadi | H04W 4/021 |

\* cited by examiner

PROVIDING NETWORK TRAFFIC ENDPOINT RECOMMENDATION BASED ON NETWORK TRAFFIC DATA ANALYSIS

BACKGROUND

Many companies subscribe to or otherwise use network services from other entities, effectively becoming customers of those entities to use their infrastructure. Customers can control, to some degree, how their network traffic may be routed within the infrastructure by selecting endpoint servers. The customers may select endpoints to use based on current knowledge about their end users, such as their locations, but this knowledge may not always be accurate. Often, the only way to obtain feedback is to request performance reporting from the end users. Computing latency between endpoints, end users, and other entities in a network is a complicated process, such that obtaining accurate data is challenging or even impossible in some instances. Further, a customer's end user base may be highly dynamic, such that recent end user location data may quickly become out-of-date and inaccurate for making routing decisions.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method and system for identifying and establishing an endpoint within a network for a customer based on network traffic data analysis is described. Latency data associated with accessing a first endpoint within a network by a plurality of end user devices from a plurality of geographic regions is collected, wherein the plurality of end user devices are associated with a plurality of customers. Performance scores for the plurality of geographic regions are calculated based at least on the collected latency data. A subset of the calculated performance scores based on network traffic of end user devices of one of the plurality of customers is selected, wherein the network traffic originates from one or more of the plurality of geographic regions. A second endpoint is identified within the network for the one of the plurality of customers based on the selected subset of the performance scores and volume of the network traffic from the one or more of the plurality of geographic regions. The second endpoint is established within the network for the one of the plurality customers for the network traffic originating from the one or more of the plurality of geographic regions to reduce latency.

Many of the attendant features will be more readily appreciated as the same becomes better understood by reference to the following detailed description considered in connection with the accompanying drawings.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 5, the systems are illustrated as schematic drawings. The drawings may not be to scale.

DETAILED DESCRIPTION

Aspects of the disclosure provide a system and method for providing an endpoint recommendation based on analysis of network data traffic. Network traffic data associated with customers is collected, wherein the network traffic data includes at least latency data and endpoint location data. A network traffic pattern is generated based on analysis of the collected network traffic data, where the network traffic pattern includes a plurality of traffic regions associated with geographic regions. The generated network traffic pattern may be visualized, such as on a geographical map using colors to indicate the network data traffic.

Performance scores of the traffic regions are calculated based on the latency data of the network traffic data and the traffic volume associated with each customer. An endpoint recommendation associated with at least one traffic region is generated for each customer of the set of customers based on the calculated performance scores, and the generated endpoint recommendations are provided to the associated customers. Generated endpoint recommendations may indicate changes to the associated customer's endpoint configuration and/or settings to improve or optimize the performance scores.

The described methods and systems provide an automated way for customers to view network traffic patterns associated with endpoints to which they are subscribed, as well as a way to provide the customers with recommendations as to how to improve the performance of their networks by expanding to use more and/or different endpoints. The systems provide dynamic, interactive visualization of the state and performance of customers' networks in the form of heatmaps. Such visualizations provide users with network traffic data delivered in a user-friendly way, enabling fast, effective navigation and comprehension of a customer's network related data. In this manner, the operations described herein operate in an unconventional way to analyze and visualize network traffic, and make recommendations about endpoint locations.

Further, the described systems operate in an unconventional way by making use of machine learning techniques to enable estimation and/or prediction of future network behavior based on collected network traffic data. The machine learning component of the system may be tuned over time to improve the accuracy of the estimations. Such estimations may be used to determine not only the performance of a customer's current network of endpoints, but also to identify endpoints that would likely improve the performance of a customer's network if included, based on the network traffic data specific to that customer and/or similar customers, thereby improving the user experience of end users that make use of the customer's services.

Figure 1:
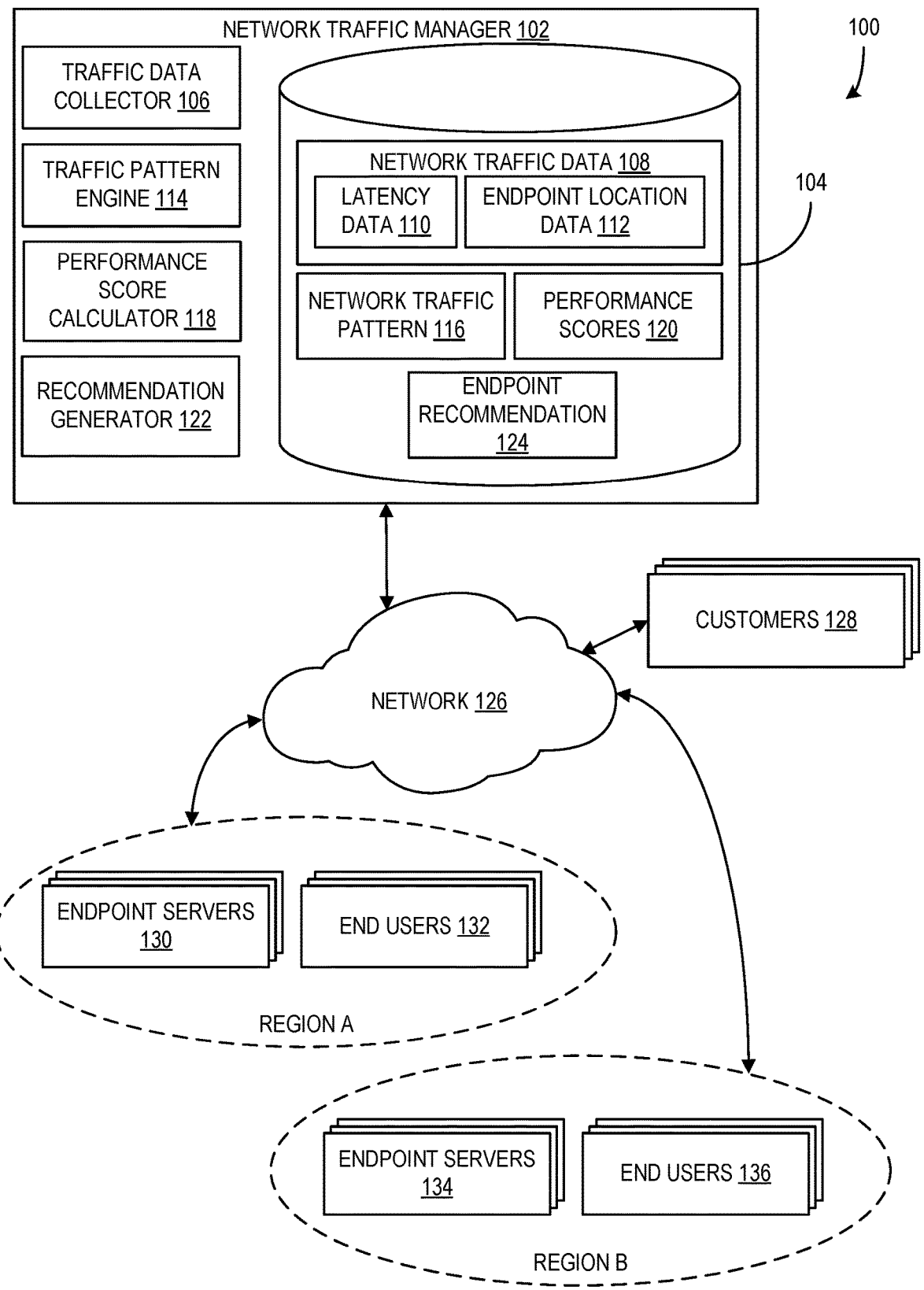
FIG. 1 is an exemplary block diagram illustrating a system configured for providing an endpoint recommendation and displaying a network traffic pattern according to an embodiment.

FIG. 1 is an exemplary block diagram illustrating a system 100 configured for providing an endpoint recommendation 124 and display a network traffic pattern 116 according to an embodiment. The system 100 includes a network traffic manager 102 (e.g., AZURE® traffic manager, etc.) that is configured to interact with customers 128 (e.g., via a web browser or other application), endpoint servers 130, 134, and end users 132, 136 (e.g., via a web browser or other application) over a network 126 as described herein.

The network traffic manager 102 is a system component composed of hardware, firmware, and/or software configured to perform the network traffic operations described herein. In some examples, the network traffic manager 102 manages network traffic associated with customers 128 and/or other system entities by identifying routes and endpoints, but does not perform the actual routing (e.g., does not forward network packets). The network traffic manager 102 may be configured to enable customers 128 to manage the routing of their customer traffic (e.g., directing traffic to a best endpoint server 130 or 134 to which the particular customer 128 is subscribed based on a customer profile, etc.). For instance, the network traffic manager 102 may enable customers to have their traffic routed based on domain name service (DNS) level routing to the closest endpoint to the source of the traffic (e.g., an end user 132 or 136, etc.). Further, the network traffic manager 102 is configured to provide visualization and endpoint recommendations based on analyzed network traffic patterns as described herein.

The network traffic manager 102 includes a traffic manager data store 104, a traffic data collector 106 configured to collect network traffic data 108 including latency data 110 and endpoint location data 112, a traffic pattern engine 114 configured to generate a network traffic pattern 116 based on the network traffic data 108, a performance score calculator 118 configured to calculate performance scores 120 based on the network traffic pattern 116, and a recommendation generator 122 configured to generate an endpoint recommendation 124 based on the performance scores 120, the network traffic pattern 116, and/or the network traffic data 108.

The traffic data collector 106 is a component of the network traffic manager 102 that includes hardware, firmware, and/or software configured for collecting the network traffic data 108 from customers 128, endpoint servers 130, 134, and/or other components of the system 100. In some examples, the traffic data collector 106 interacts with an interface of the network traffic manager 102 to receive (and optionally request) network traffic data 108 via the network 126. The traffic data collector 106 may request network traffic data 108 each time the network traffic manager 102 initiates the process described herein. Alternatively, or additionally, the traffic data collector 106 may be configured to receive network traffic data 108 at a defined interval or intervals and/or in response to interactions from other components of the system 100. For instance, the network traffic manager may be configured to contact each endpoint server 130 and/or 134 at regular intervals to check on the status of the servers (e.g., a hypertext transfer protocol (HTTP) health check, etc.). The traffic data collector 106 may be configured to request at least a portion of the network traffic data 108 in sync with such status checks. In other examples, the traffic data collector 106 may be configured to expose an application program interface (API) or other communication channel to which the customers 128 and/or other components of the system 100 may send the network traffic data 108 with or without the network traffic data 108 being requested by the traffic data collector 106.

The network traffic data 108 includes latency data 110, endpoint location data 112, and/or other data associated with the network traffic of the network 126 and/or associated with the endpoint servers 130, 134 and end users 132, 136 (e.g., network load data, dropped packet data, end user address data, etc.). In some examples, latency data 110 includes data values associated with the length of time required to transfer data between the end users 132, 136 and the endpoint servers 130, 134. Further, the latency data 110 may include latency data values associated with the domain name system (DNS) query latency associated with network activity of the end users 132, 136 and endpoint servers 130, 134.

Additionally, or alternatively, the latency data 110 may include latency data values associated with average or representative latency associated network data traffic between defined sets of entities and/or over defined periods of time. For instance, latency data 110 may include latency data values indicating an average or representative latency of end users 132 in network interactions with the endpoint servers 130 over the past week. Representative latency values associated with other combinations of entities on the network 126 and/or over other periods of time may be collected as latency data 110 without departing from the description.

The endpoint location data 112 may be collected from the customers 128 who make use of endpoint servers 130, 134, from communication with the endpoint servers 130 and 134 themselves, or from a data store or data stores associated with the endpoint servers 130 and 134. The endpoint location data 112 may include region identifiers indicating a region in which each endpoint is located, geographic location data, such as coordinates indicating the geographic location of each endpoint, network hierarchy data and/or network address data indicating the location of each endpoint in a network relative to other devices or entities in the network, and/or physical address data indicating a location of each endpoint based on an address of a building in which the endpoint is located (e.g., street address information, zip code or other area code information, etc.). The endpoint location data 112, whether based on geography or relative network location, may be used by the network traffic manager 102 during generation of endpoint recommendations 124 and/or for displaying a network traffic pattern 116 as a visualization as described herein The traffic pattern engine 114 is a component of the network traffic manager 102 that includes hardware, firmware, and/or software configured to generate a network traffic pattern 116 based on the network traffic data 108. In some examples, the traffic pattern engine 114 is configured to analyze the network traffic data 108 for each customer 128 separately and, in combining the analyzed data into a network traffic pattern 116, enable a comparison of network traffic associated with multiple customers. Further, the network traffic data 108 may be analyzed based on the regions in which the associated end users and/or endpoint servers are located (e.g., endpoint servers 130 and end users 132 in region A, endpoint servers 134 and end users 136 in region B, etc.). In some examples, the traffic pattern engine 114 is configured to include a machine learning module that applies machine learning techniques to the network traffic data 108 to generate the network traffic pattern 116. The analysis of the network traffic data 108 and generation of the network traffic pattern 116 is described in greater detail in the descriptions of FIG. 2 and FIG. 3.

The network traffic pattern 116 is data in a data structure that is representative of the network traffic behavior in the network 126 with respect to the endpoint servers 130, 134, end users 132, 136, and/or other entities that communicate over the network 126. The network traffic pattern 116 may include traffic latency data patterns based on the location of the associated endpoint servers 130, 134 and end users 132, 136 and/or based on the customers 128 with which the associated communications are between the endpoint servers 130, 134 and end users 132, 136 are associated (e.g., a pattern of latency values of all network communications from end users 132, 136 to endpoint servers 130, 134 associated with a first customer of the customers 128, etc.). In some examples, a generated network traffic pattern 116 includes aggregated traffic data that includes the end user source Internet protocol (IP) addresses arranged in groups by subnet. Data values associated with the volume of traffic (e.g., DNS requests, etc.) of each subnet are determined and stored with the network traffic pattern 116. Such data may be used as described herein when determining performance scores and/or recommending endpoints. A network traffic pattern 116 may further include other types of network traffic data and/or data based on analysis of network traffic data. Network traffic patterns and applications thereof are described in greater detail herein.

In some examples, generating the network traffic pattern includes aggregating or otherwise combining the network traffic data associated with specific regions, specific customers, specific endpoints/endpoint servers, and/or specific sets of end users. Once the data associated with a particular entity is combined, analysis is applied to determine representative network traffic data values associated with the entity. For instance, latency data associated with communicating with a specific endpoint server may be analyzed to determine an average or representative latency data value over a time period from which the latency data is collected. In another example, latency data specific to each customer of a plurality of customers may be analyzed separately to determine representative latency data values for each customer and then those values may be compared to determine which customer(s) may benefit most from expanding use of endpoint servers, etc. Further, such customer-specific analysis may also be done based on specific regions or sets of endpoint servers, enabling each customer to access and eventually view a current state of their network traffic performance and identify regions or endpoint servers that may be underperforming with the help of a system as described herein.

In some examples, the generated network traffic pattern may include a plurality of network traffic patterns that are specifically associated with customers, regions, endpoint servers, or the like as described above. Each specific network traffic pattern may include data values associated with network transactions between endpoint servers, end users, and other entities participating in the network transactions (e.g., a customer-specific network traffic pattern may include latency data values associated with all network transactions between end users and endpoint servers associated with the customer over a defined time period, etc.).

In addition to calculated representative data values, the network traffic pattern may include forming associations or relationships between network traffic data and associated entities in the network traffic pattern data structure. For instance, a representative latency data value associated with a specific region may be mapped or otherwise associated with the region as well as with each customer that uses and endpoint in the region and/or interacts with end users in the region. Such mappings may enable users to use the network traffic pattern to view and/or further analyze the state of the network and associated traffic, network load, and/or other facets of performance of the network (e.g., the network traffic pattern may be used visualization of network performance and/or identifying locations for recommended endpoint expansion as described herein, etc.).

In some examples, generating the network traffic pattern includes generating estimates and/or predictions of future network behavior by applying machine learning techniques to the network traffic data (e.g., by a machine learning module of the traffic pattern engine 114, etc.). The network behavior estimates generated by machine learning may include network traffic load estimates, latency estimates, predicted changes in network traffic pathing, etc. In addition to applying machine learning to the collected network traffic data, the network traffic data may also be used as feedback data for adjusting and/or improving the generation of estimated future network behavior data. Applying the described machine learning may result in updates, changes, and/or adjustments to the estimate generation rules or thresholds based on network traffic data used as feedback (e.g., a set of network behavior estimate data may be compared to collected network traffic data from the same time period to determine the accuracy of the network behavior estimate data and make changes to the way that estimate data is generated to improve future accuracy, etc.). For instance, if the estimate data for a time period is found to be within a defined level of accuracy when compared to network traffic data that is eventually collected for that time period, the current method(s) of generating estimate data may be maintained and/or reinforced. Alternatively, if the estimate data for the time period is found to not meet a defined level of accuracy when compared to network traffic for the same time period, the method(s) used to generate the estimate data may be adjusted based on machine learning techniques to improve the accuracy of estimate data generated in the future.

In some examples, a machine learning module used to generate network behavior estimate data comprises a trained regressor such as a random decision forest, directed acyclic graph, support vector machine, neural network, or other trained regressor. The trained regressor may be trained using the feedback data described above. Examples of trained regressors include a convolutional neural network and a random decision forest. It should further be understood that the machine learning module, in some examples, may operate according machine learning principles and/or techniques known in the art without departing from the systems and/or methods described herein.

In an example, the machine learning module may make use of training data pairs when applying machine learning techniques and/or algorithms. Millions of training data pairs (or more) may be stored in a machine learning data structure (e.g., the data store 104, etc.). In some examples, a training data pair includes a feedback data value paired with a rule adjustment value and/or a threshold adjustment value used in the generation of network behavior estimate data. The pairing of the two values demonstrates a relationship between the feedback data value and the adjustment values that may be used by the machine learning module to determine future rule adjustments and/or threshold adjustments according to machine learning techniques and/or algorithms.

The performance score calculator 118 is a component of the network traffic manager 102 that includes hardware, firmware, and/or software configured to calculate performance scores 120 associated with the endpoint servers 130, 134. Calculated performance score 120 may include performance scores associated with the performance of specific endpoint servers 130 and/or 134, performance scores associated with endpoint servers in a specific region (e.g., regions A and/or B, etc.), and/or performance scores associated with endpoint servers of specific customers of the customers 128 across multiple regions or within specific regions. For instance, performance scores 120 may be calculated for the general network performance of all endpoint servers associated with a customer 128 and/or for the network performance of endpoint servers of the customer 128 within the region A. Alternatively, or additionally, the performance score calculator 118 may be configured to calculate performance scores for any permutation of subnet of a network 126 as would be understood by a person of ordinary skill in the art without departing from the description herein.

Performance scores 120 may be based on the latency data 110 associated with specific endpoint servers 130 and/or 134 and interactions with the end users 132 and/or 136. For instance, a performance score 120 for an endpoint server 130 may be calculated based on latency values of network communications with end users 132 and/or 136. The latency values used to calculate a performance score 120 may be associated with a defined time period (e.g., over the last day, over the last week, over the past 12 hours, etc.). In some examples, a calculated performance score 120 for an endpoint server may be calculated relative to the latency data 110 and other network traffic data 108 associated with endpoint servers in the same region, endpoint servers associated with the same customer 128, and/or endpoint servers that have communicated with the same or similar sets of end users 132 and/or 136 (e.g., a performance score 120 may indicate a rank of a particular endpoint server 130 among all other endpoint servers 130 in region A, etc.). Further, other data may be used to calculate performance scores, such as end user statistics, traffic load data, traffic source-based data, subnet-based data, etc. The performance score 120 takes the form of a letter rating, numerical value, color-coding, or other indication of the calculation.

The recommendation generator 122 is a component of the network traffic manager 102 that includes hardware firmware, and/or software configured to generate an endpoint recommendation 124 based on the network traffic pattern 116 and the performance scores 120. The recommendation generator 122 accesses the network traffic pattern 116 to analyze the portion of the pattern 116 associated with one or more of the customers 128 and determine whether one or more of the customers 128 may benefit from expanding to make use of endpoint servers 130 and/or 134. For instance, the recommendation generator 122 may determine that a customer 128 that uses one or more endpoint servers 134 in region B would have increased or otherwise improved performance scores 120 if the customer 128 began using one or more endpoint servers 130 in region A and, as result, the recommendation generator 122 generates an endpoint recommendation 124 indicating that the customer 128 should expand to make use of endpoint servers 130 in region A. Generating a recommendation may include comparing the performance scores 120 of customers 128 that have similar patterns of network traffic, comparing performance scores 120 associated with endpoint servers 130 and/or 134 that provide similar services to sets of end users in various regions, etc.

The recommendation generator 122 may be configured to compare one or more performance scores 120 of a customer 128 to one or more defined performance score thresholds to determine whether to make an endpoint recommendation 124 and/or which endpoint recommendation 124 to make. For instance, a performance score threshold may be defined that indicates a maximum performance score of an endpoint server for which the recommendation generator 122 generates a recommendation 124 (e.g., only endpoint servers with performance scores above or below the defined performance score threshold are candidates for the generation of an endpoint recommendation 124, etc.). Alternatively, or additionally, performance score thresholds may be defined that are associated with each region and/or other possible groupings or subnets of endpoint servers (e.g., thresholds based on sets of end users that use the endpoint servers, thresholds based on sets of customers 128, etc.), such that determining whether to generate a recommendation may be based on more granular groupings of endpoint servers, end users, and/or customers (e.g., if the endpoint servers of a region tend to have high performance scores generally, a higher performance score threshold may be defined for the region, etc.). Such thresholds may be dynamically defined and updated by the system based on latency or other performance measures relative to the other customers in a set or sets of customers. The operations of the recommendation generator 122 to generate an endpoint recommendation 124 are described further in the descriptions of FIGS. 2 and 3.

The network 126 includes one or more computer networks that are configured to enable network communications between the network traffic manager 102 and devices associated with the customers 128, endpoint servers 130, 134, and end users 132, 136. It should be understood that communications between components of the system 100 may be performed using network connections on the network 126 as would be understood by a person of ordinary skill in the art of computer networks and communications. The network 126 may include a plurality of networks (e.g., private intranets, public networks such as the Internet, etc.) and/or network types (e.g., wired networks, wireless networks such as Wi-Fi networks or cellular networks, etc.). The network 126 may include any hardware, firmware, and/or software arranged in hierarchies or structures that enable the components of the system 100 to communicate as described without departing from the description herein.

The customers 128 are organizations, individuals, or other entities that make use of one or more of the endpoint servers 130 and/or 134 to communicate with and/or provide services to the end users 132, 136. Customers 128 may include companies that provide websites and/or other network-based portals through which end users are enable to purchase goods and/or services. Further, customers 128 may include entities that provide network-based services to end users 132, 136 via the endpoint servers 130 and/or 134. The customers 128 may interact with the network traffic manager 102 by providing at least a portion of the network traffic data 108 and requesting and/or receiving endpoint recommendations 124. Further, customers 128 may interact with the network traffic manager 102 to view network traffic patterns 116 in a visualization and/or establish use of new endpoint servers (e.g., subscribe to the new endpoint servers, install software on the new endpoint servers, etc.) based on the endpoint recommendations 124 as described herein.

Regions A and B include endpoint servers 130 and end users 132, and endpoint servers 134 and end users 136 respectively. Each region of regions A and B are associated with a defined geographic region in which the associated endpoint servers and end users are located. The endpoint servers 130, 134 and end users 132, 136 may communicate with each other and other entities of the system 100 via network 126 as described herein. The region in which an endpoint server and/or end user is located may be used by the network traffic manager 102 in determining an associated performance score 120 and in determining whether to recommend the establishment of use of an endpoint server in the endpoint recommendation 124. While two regions are illustrated in system 100, it should be understood that, in other examples, more and/or different regions may be included in the system 100 without departing from the description.

The endpoint servers 130, 134 are components that include hardware, firmware, and/or software that are configured to provide access to services for end users 132 and/or 136 (e.g., data center services, etc.). The endpoint servers 130, 134 may include hardware servers and/or software servers (e.g., virtual servers running on hardware computing devices, etc.). Customers 128 may subscribe to and use the endpoint servers to provide their associated services to the end users and, further, customers 128 may pay another entity (e.g., an organization or company that manages the endpoint servers 130, 134 and offers use of the servers as a service to the customers 128 for the use by the endpoint servers. It should be understood that the endpoint servers 130, 134 may provide end users access to websites, APIs, other application portals, network services, etc. as would be understood by a person of ordinary skill in the art without departing from the description herein.

End users 132, 136 may be individual users or organizations of users that access the endpoint servers 130, 134 and/or other entities on the network 126 via computing devices as would be understood by a person of ordinary skill in the art. In some examples, the network traffic data 108 that is analyzed primarily originates from the end users 132 and/or 136, such that the locations of the end users 132 and/or 136 (e.g., the originating locations of the network traffic, etc.) in the regions A or B and how those locations relate to the locations of the endpoint servers 130 and/or 134 may be used to generate associated network traffic patterns 116 and performance scores 120 as described herein.

Figure 2:
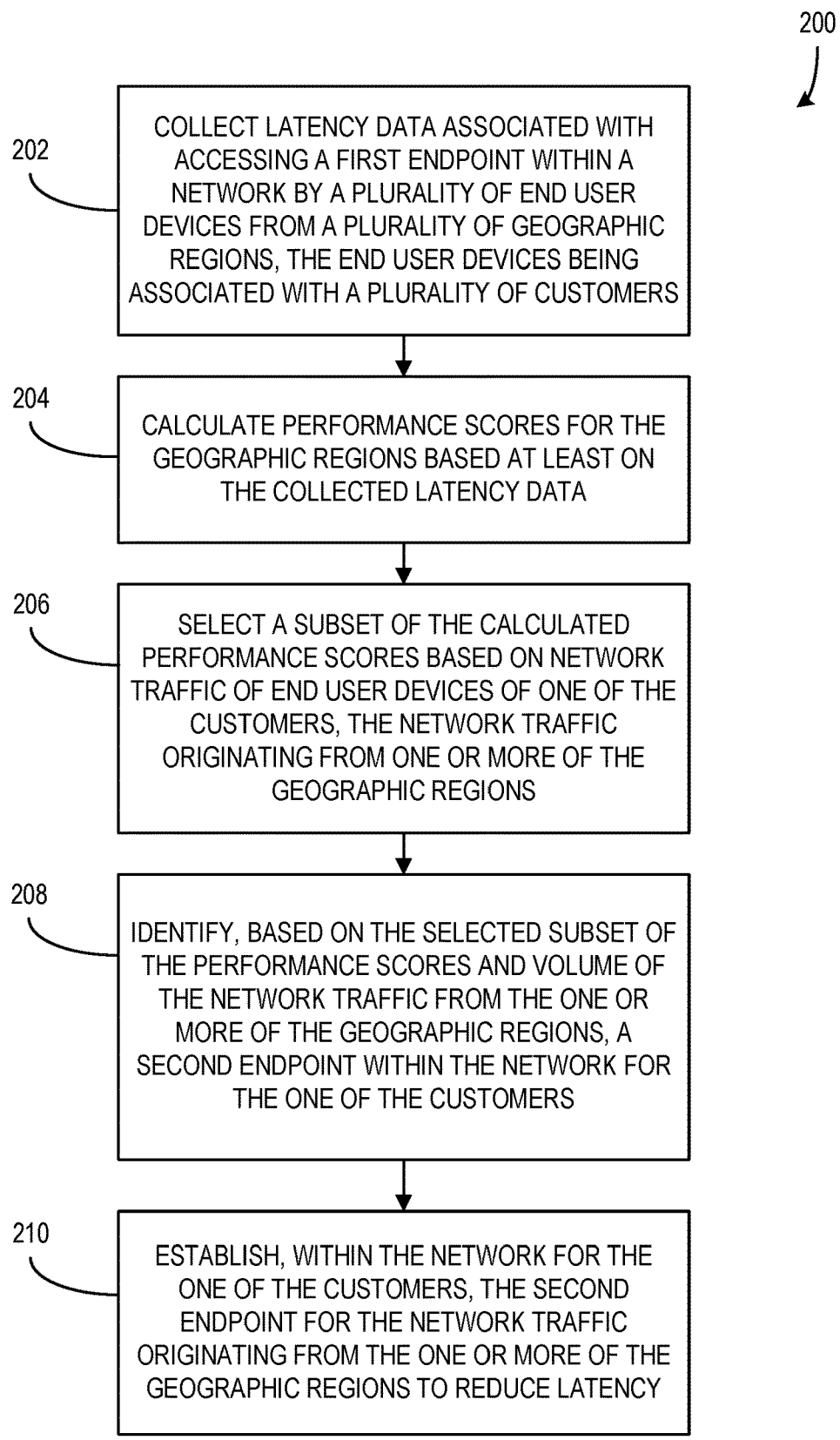
FIG. 2 is an exemplary flow chart illustrating a method of identifying and establishing a second endpoint for network traffic for a customer according to an embodiment.

FIG. 2 is an exemplary flow chart 200 illustrating a method of identifying and establishing a second endpoint (e.g., via a generated endpoint recommendation 124, etc.) for network traffic for a customer according to an embodiment. In some examples, the processes described in flow chart 200 may be performed by a network traffic manager component (e.g., network traffic manager 102, etc.). The described process may be initiated by request (e.g., a customer may request access to a network traffic pattern and any associated recommendations, etc.), based on a scheduled execution (e.g., the network traffic manager may be configured to perform the process once per day or on another schedule, etc.), and/or otherwise triggered by interactions with users of the system 100 and/or other entities of the system 100. At 202, latency data (e.g., latency data 110, etc.) associated with accessing a first endpoint (e.g., endpoint servers 130, 134, etc.) within a network (e.g., network 126, etc.) by a plurality of end user devices (e.g., end users 132, 136, etc.) from a plurality of geographic regions (e.g., regions A and B in FIG. 1, etc.), wherein the plurality of end user devices are associated with a plurality of customers (e.g., customers 128, etc.). In some examples, collecting the latency data may further include collecting other associated network traffic data (e.g., network traffic data 108, etc.). The latency data may be collected from one or more entities that are connected to the associated network and aggregated, combined, or otherwise stored in a data store (e.g., data store 104, etc.). Collection of the latency data may include communication of the data through application program interfaces (APIs) associated with a traffic manager component (e.g., traffic manager 102, etc.), such as representational state transfer (REST) APIs. The latency data may be shared, transmitted, or otherwise transferred in any manner that would be understood by a person of ordinary skill in the art without departing from the description herein.

At 204, performance scores (e.g., performance scores 120, etc.) for the plurality of geographic regions are calculated based at least on the collected latency data. In some examples, the calculated performance scores may further include performance scores that are associated with a variety of different sets of network behavior (e.g., performance scores specific to network transactions associated with a particular customer, performance scores specific to network transactions associated with a particular region, performance scores specific to network transactions associated with a particular endpoint server or set of endpoint servers, performance scores specific to network transactions associated with a particular end user or set of end users, etc.).

Calculating the performance scores may include aggregating latency data values collected over a defined time period and determining a performance score based on the aggregated data values. For instance, an average latency value may be calculated for a network transaction associated with a specific customer and a performance score may be determined based on the average latency value (e.g., a mapping of ranges of average latency values to performance scores may be defined and applied, etc.). Alternatively, or additionally, other data values may be used to calculate or otherwise determine performance scores. For instance, a range of changes in latency values may be used as a measure of consistency of network performance for the purpose of calculating performance scores, such that network behavior that has more consistent latency values may receive a higher performance score than network behavior that is less consistent. A consistency value may be determined based on the aggregated latency values and used to determine the performance score. Other values or factors that may be used to calculate performance scores may include network load values and/or throughput values, end user-based statistic values (e.g., number of end users served by an endpoint, etc.), etc. It should be understood that the performance scores may be calculated based on any combination of network performance factors as would be understood by a person of ordinary skill in the art without departing from the description.

At 206, a subset of the calculated performance scores based on network traffic of end user devices of one of the plurality of customers is selected, the network traffic originating from one or more of the plurality of geographic regions. The one of the plurality of customers that is selected may be selected based on an endpoint recommendation request from the particular customer as described herein, based on an order in which each of the customers is selected for endpoint traffic analysis, or based on other associated operations of the system.

At 208, a second endpoint within the network is identified for the one of the plurality of customers based on the selected subset of the performance scores and volume of the network traffic from the one or more of the plurality of geographic regions. The identified second endpoint is specific to a first customer of the at least one customer and based on the calculated performance scores associated with the network traffic data of the first customer. In some examples, identifying a second endpoint includes identifying customers and/or endpoints of customers that may benefit from establishment of a new endpoint and then determining which endpoint should be identified and/or recommended and/or where the identified endpoint should be established.

In some examples, the performance scores of multiple customers may be compared to identify endpoints within different customers' networks that may benefit other customers. For instance, a customer with a performance score that is below the performance scores of many other customers for a particular geographic region may be considered a candidate for an endpoint recommendation in the geographic region. Alternatively, or additionally, the performance score(s) of a customer may be compared to defined performance thresholds and/or defined performance ranges to determine whether establishing use of an identified endpoint may be likely to improve performance. A score range or threshold may be defined such that, when a customer's performance score in a region falls within the range or below the threshold, a recommendation of an identified endpoint is generated for that customer. Further, performance scores associated with different regions of operation for a customer may be compared (e.g., if a customer's performance scores include a single very low performance score for a particular region, an endpoint recommendation may be generated to improve the customer's performance in the region, etc.).

The specific second endpoint may be identified based on the performance scores, network traffic pattern, and/or network traffic data associated with the customer and/or associated with other similar customers. In some examples, a current endpoint or set of endpoints are identified as potential causes of poor performance (e.g., an endpoint that provides services to many end users that are located far away from the endpoint and have high latency values, etc.) and an endpoint or endpoints are identified that would be most likely to improve the performance of the customer's network traffic (e.g., an endpoint may be identified for recommendation that will serve end users in a region where the customer has no endpoints, potentially improving the latency values of the end users in the region by providing a local endpoint, etc.).

In some examples, network behavior estimate data generated by machine learning techniques as described above may be used in identifying an endpoint for recommendation to a customer. Estimate data may be analyzed or otherwise used to determine performance improvements that may occur if/when a customer establishes a recommended endpoint. Alternatively, or additionally, a traffic pattern engine (e.g., traffic pattern engine 114, etc.) that has been trained using machine learning as described above may be used to generate network behavior estimates for multiple candidate endpoints in order to determine which endpoint or endpoints should be recommended based on which endpoint or endpoints are predicted to provide the greatest increase in performance for the customer.

Alternatively, or additionally, endpoint recommendations may be generated based on other aspects of a customer's network configuration and/or behavior. For instance, endpoint recommendations are determined based on security considerations and/or availability considerations as well as the performance-based considerations described above.

At 210, the second endpoint is established within the network for the one of the plurality of customers for the network traffic originating from the one or more of the plurality of geographic regions to reduce latency. Establishing the second endpoint for the one of the plurality of customers may include providing an endpoint recommendation as described herein. The provided endpoint recommendation may identify one or more endpoints that are recommended to the customer to improve the customer's performance in providing access and/or services to end users over the network. Recommended endpoints may be identified by unique identifiers (e.g., network-based address, network-based name, etc.), location information (e.g., geographic location, relative location within a network, etc.), or the like. The recommendation may further include information about the degree of impact on the current network configuration of the recommendation (e.g., high, medium, or low impact changes, a number of resources impacted by the change, etc.), information and/or instructions regarding how the customer may establish use of the recommended endpoints (e.g., cost information for making use of the recommended endpoints (e.g., billed cost per DNS query, etc.), technical instructions for installation and/or configuration tasks, contractual information associated with agreements that must be made with the owner of the recommended endpoints, contact information regarding who to contact to establish use of the recommended endpoints, etc.).

Additionally, the endpoint recommendation may include network traffic pattern data associated with the customer's current network traffic pattern and the recommended endpoints. For instance, the endpoint recommendation may include information that compares the current performance of the customer's network with predicted or estimated performance of the customer's network after use of the recommended endpoints is established (e.g., the customer may be provided a projected performance improvement, such as a projected amount that latency times will be reduced for the customer's end users, etc.). Such information may be provided in text form, graphic form, a visualization, or a combination thereof After providing the endpoint recommendation to the customer, establishing use of the recommended endpoint may include enabling the customer to either accept or reject the recommendation. Acceptance of the recommendation may result in the user being guided through the process of establishing use of one or more of the recommended endpoints for the associated customer. In some examples, the establishment of the recommended endpoint for the customer may be substantially or completely automatic. Rejection of the recommendation may end the process for the user. Alternatively, or additionally, the user may be prompted to provide information after either acceptance or rejection of the recommendation (e.g., the user's motivation or reason for accepting or rejecting, etc.). Such information may be used as additional feedback data for use by a machine learning component of the system that may be configured to adjust how endpoint recommendations are generated using machine learning techniques as would be understood by a person of ordinary skill in the art.

Figure 3:
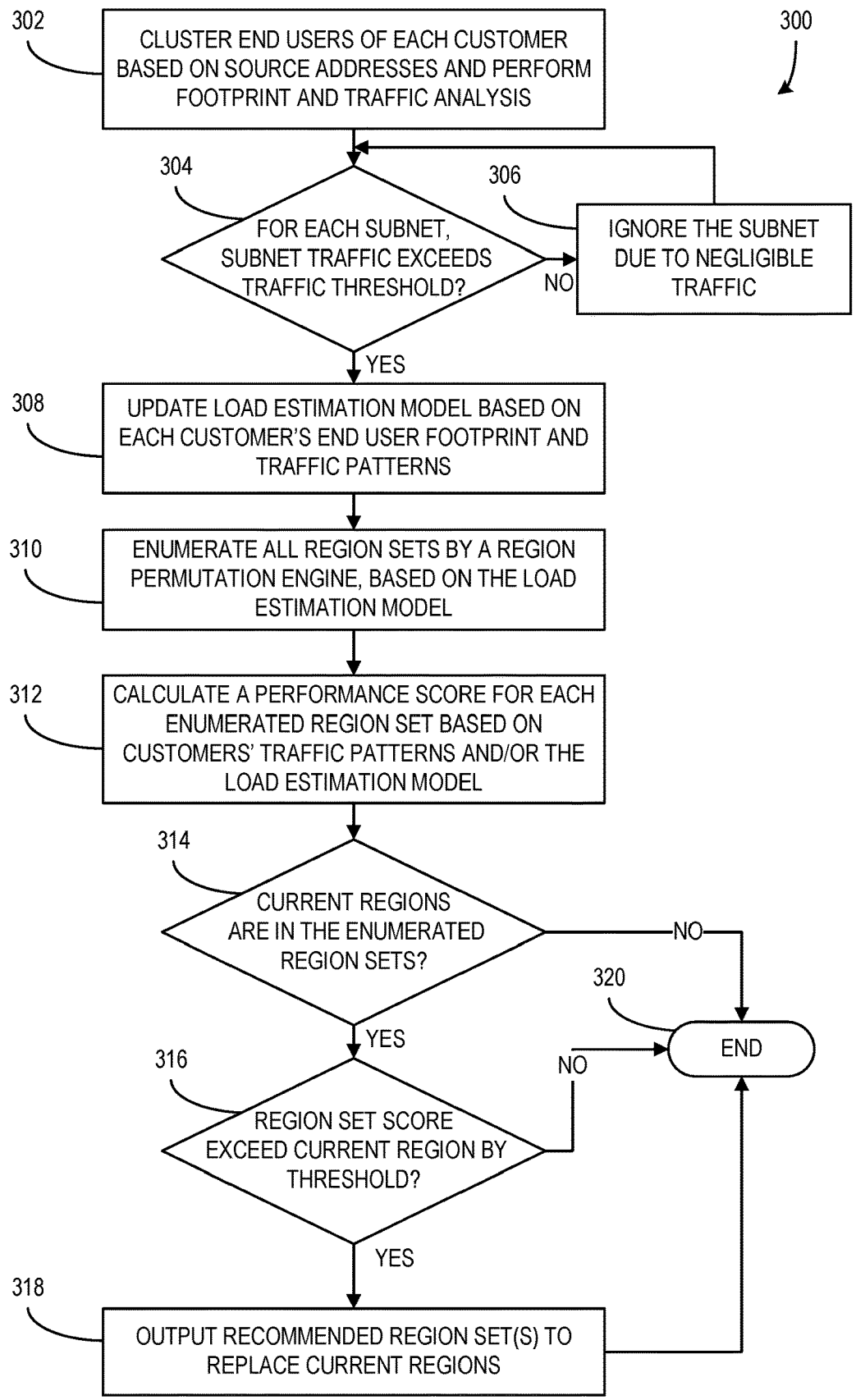
FIG. 3 is an exemplary flow chart illustrating a method of providing an endpoint recommendation including filtering subnets with negligible traffic and identifying region sets for recommendation according to an embodiment.

FIG. 3 is an exemplary flow chart 300 illustrating a method of providing an endpoint recommendation including filtering subnets with negligible traffic and identifying region sets for recommendation according to an embodiment. In some examples, the processes of the flow chart 300 are performed by a network traffic manager component (e.g., network traffic manager 102, etc.) of a system as described herein. At 302, the end users associated with each customer are clustered based on source address and footprint and traffic analysis is performed for each customer. The source addresses of the end users, which may be collected as part of the network traffic data as described herein, may be used as an indicator of end user location, allowing for the system to determine location-based network behavior patterns as described herein. Footprint analysis provides an end user location pattern for each customer and traffic analysis provides information regarding how data traffic is flowing to and from the end users in relation to the end user location pattern. Such analyses result in the generation a network traffic pattern for each customer. In some examples, the data used in analysis of the end users may include a seven-day aggregation of all associated DNS query logs for all customers (e.g., source IP addresses, profile names, query counts, etc.).

At 304, for each subnet, the subnet traffic (e.g., a level of traffic into and/or out of the subnet based on the generated network traffic pattern, etc.) is compared to a defined traffic threshold. If the subnet traffic is below the threshold, the subnet is flagged to be ignored for the remainder of the process at 306. In some examples, subnets may be identified based on network addresses (e.g., IP addresses, etc.) of the end users and/or other network infrastructure entities within the subnet. Subnets with traffic that does not exceed the threshold are considered to have negligible traffic. By ignoring such subnets, the efficiency of the later steps of the process may be increased by eliminating network permutations that are considered. Once all subnet traffic values have been compared to the traffic threshold and all subnets with negligible traffic have been flagged to be ignored, the process proceeds to 308.

At 308, a load estimation model is updated based on each customer's end user footprint and traffic patterns. The load estimation model is a part of the network traffic pattern for the network generally and it may include network behavior estimate data generated by machine learning as described above. The network traffic patterns for each customer generated at 302 may be aggregated or otherwise combined and used to update the load estimation model of the network.

At 310, all possible, legitimate regions (e.g., possible regions that include significant traffic, etc.) of the network are enumerated by a region permutation engine based on the updated load estimation model. In some examples, the enumerated regions include hierarchies of regions based on an address structure of the network infrastructure (e.g., a first region may include multiple smaller subregions and it may also be a part of a larger region in a hierarchy, etc.). Only regions that include subnets with non-negligible traffic are included in the enumeration, as subnets previously flagged 306 are not considered.

Each enumerated region may include information regarding end users located in the region and/or end users that are being routed to the region, endpoints located in the region, and/or other information associated with the region (e.g., customers that currently operate in the region, etc.). For instance, a region may include an identifying region number, location data associated with the region (e.g., geographic location data, etc.), and a list of customer profiles that may be associated with the region. Further, deployed endpoint information, such as customer profiles associated with the endpoint, the endpoint's location and/or other associated network location data, etc. may be included for each enumerated region.

When all the legitimate regions are enumerated, performance scores are calculated for each enumerated region at 312. Calculation of performance scores may be performed as described above, and they may be based on the customers' network traffic patterns and/or the load estimation model, including latency data associated with latency measurements for end users, traffic load data, subnet-based data and/or traffic source-based data.

At 314, the current regions (e.g., the current set of regions and/or the associated region configuration, etc.) are compared to the enumerated region sets. If the current regions are present in the enumerated region sets, the process continues to 316. Alternatively, if the current regions are not present in the enumerated region sets, the process ends at 320. In some examples, a customer's region or regions may not be in the enumerated region set due to a lack of information, such as latency data. Such regions may not be included in the enumerated region sets because calculating accurate performance scores may be difficult or impossible.

At 316, the performance scores associated with the current regions are compared to performance scores of other enumerated region sets to determine whether one or more alternative region sets have performance scores that are greater than the current performance scores by a defined performance threshold. Upon identifying one or more region sets with performance scores that exceed the current regions' performance scores by at least the defined threshold amount, the identified region sets are output as recommended region sets to replace the current regions at 318 (e.g., the identified region sets may be provided to a customer as a portion of an endpoint recommendation 124, etc.). Alternatively, if no alternative region sets are identified, the process ends at 320. Further, after the recommended region sets are outputted at 318, the process ends at 320.

In some examples, the performance threshold used at 316 may be defined based on consideration of the costs associated with converting from the current regions and associated configuration to a recommended region set. The performance threshold may be set at a value such that a region set is not recommended unless the estimated performance improvement exceeds the potential cost of conversion to the region set.

Figure 4:
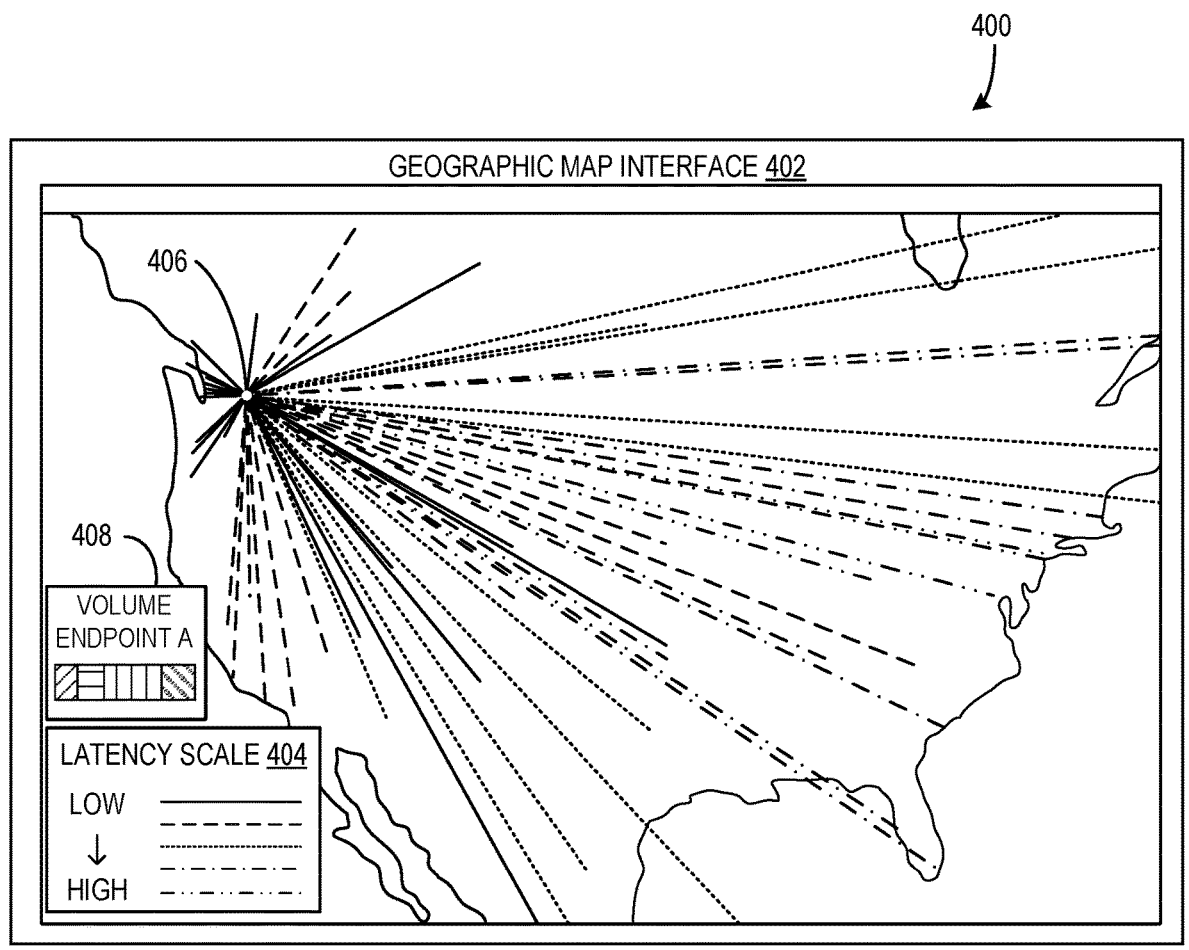
FIG. 4 is an exemplary visualization of a network traffic pattern based on network traffic data analysis according to an embodiment.

FIG. 4 is an exemplary visualization 400 of a network traffic pattern based on network traffic data analysis according to an embodiment. In some examples, the network traffic pattern displayed as a heat map in the visualization 400 may be generated by a network traffic manager (e.g., network traffic manager 102, etc.) as described herein. The visualization 400 shows geographic map interface 402 upon which a variety of endpoints and line segments are overlaid. Additionally, the visualization 400 includes a latency scale 404 that illustrates latency values indicated by the various forms of the line segments overlaid on the map. For example, in FIG. 4, the different latencies are represented by different dash and/or dot patterns on the lines (e.g., solid lines indicate low latency, while lines having a pattern of one solid line with two dots indicate high latency). One of the endpoints on the map represents an endpoint A 406, and has been selected in this visualization. The line segments extend from the selected endpoint A 406 to other endpoints on the map, representing end user devices or sets of end user devices in those locations that have interacted with the selected endpoint A 406 via network communications, forming a heat map associated with the selected endpoint A 406. In some examples, the lines between the end user devices and the selected endpoint A 406 are color coded, instead of dashed or dotted, to illustrate the representative latency of DNS queries of the associated end user device to the endpoint A 406 based on a latency color scale (e.g., red indicating high latency, while green indicating low latency). Further, a traffic volume chart 408 of the selected endpoint is overlaid on the visualization 400. The chart represents the fractions of the total traffic volume to the endpoint A 406 that are associated with each latency range represented on the latency scale. Users observing the visualization 400 can identify latency-based performance of the selected endpoint A 406 with respect to end user devices throughout the regions illustrated by the map.

In some examples, rendering a heat map of network traffic for a customer includes receiving a data structure (e.g., at least a portion of a network traffic pattern 116, etc.) and processing the data structure for display. For instance, a data structure including data traffic query data sorted by latitude, longitude, and latency may be processed to display a heat map visualization. An example JavaScript Object Notation (JSON) schema of such a data structure is listed below.

| Data Value | Type |
| --- | --- |
| ID | String |
| properties.startTime | DateTime |
| properties.endTime | DateTime |
| properties.endpoints | N/A |
| properties.endpoints[i].resourceId | String |
| properties.endpoints[i].location | String |
| properties.endpoints[i].target | String |
| properties.endpoints[i].endpointId | Int32 |
| properties.trafficFlows | N/A |
| properties.trafficFlows[i].latitude | Number |
| properties.trafficFlows[i].longitude | Number |
| properties.trafficFlows [i].sourceIp | String |
| properties.trafficFlows[i].queryExperiences[j].latency | Integer? |
| properties.trafficFlows[i].queryExperiences[j].queryCount | Integer |
| properties.trafficFlows[i].queryExperiences[j].endpointId | Integer |

In the exemplary schema above, the data structure of the data used in displaying a heatmap is described. For each request to display a heat map, an instance of such a data structure may be processed. Each data structure has an ID value that is a identifier of the particular heat map request. The data structure also includes hierarchy of property data. The startTime and endTime values define the range of time from which traffic data is collected for display in the heat map. The endpoints property includes a set of endpoints associated with the customer's profile that received network traffic (e.g., queries, etc.) during the defined time period. Each endpoint in the endpoints set includes a resourceId that identifies the endpoint, a location value that identifies the region to which the endpoint is closest, a target value that indicates the target of the endpoint (e.g., a domain name or IP address, etc.), and an endpointId that identifies the endpoint specifically in each JSON data structure. The data structure further includes an array of trafficFlows that include unique "query experiences" for each endpoint to which the traffic was routed. Each trafficFlows element includes a latitude indicating the latitude at which the trafficFlow data is mapped, a longitude indicating the longitude at which the trafficFlow data is mapped, and a sourceIP indicating a source address that produced the traffic associated with the trafficFlow data (e.g., the address may be associated with an local domain name service (LDNS) or client IP subnets, etc.). TrafficFlows elements further include queryExperiences data, which include latency values indicating the latency between the particular traffic flow and the endpoint indicated by the endpointId, a queryCount value that indicates the number of queries that made up the traffic flow, and an endpointId indicating and identifier of the endpoint to which the traffic flow was routed. The data of this data structure may be requested, received, and processed using APIs (e.g., REST APIs, etc.), resulting in the endpoints and associated traffic flows being mapped to the geographic map interface for viewing.

In some examples, users may be enabled to interact with the visualization 400 by selecting endpoints and/or end users to highlight the selected entity and cause line segments representing associated latency values associated with the selected entity to be overlaid on the map. Further, in examples where one or more endpoint recommendations have been generated for the user, the visualization 400 may include highlighted points on the map that indicate the location(s) of the recommended endpoints. Selecting a recommended endpoint may cause latency line segments to be displayed that are associated with predicted network behavior based on use the recommended endpoint being established for the customer/user. Such recommended endpoints may be highlighted based on an identifying color, shape, or other visual property or effect (e.g., a blinking point, a star shape, a circled point, etc.). It should be understood that other visualization configurations that display details about a network traffic pattern on an associated geographic map may be used without departing from the description herein.

Additional Example Scenarios

Aspects of the disclosure enable various additional scenarios, such as next described.

In an example, a user who is part of a customer organization accesses a network traffic manager application to view the current state of the network behavior of the customer organization with respect to endpoints that the customer organization currently uses. The user selects to view a data traffic heatmap visualization of the network behavior of the customer organization. The network traffic manager causes a geographic map interface to be displayed and overlays a network traffic pattern associated with the customer organization over the geographic map interface. The network traffic pattern overlaid on the geographic map interface and displayed to the user may be generated from current network traffic data based on the user's request to view the visualization. The displayed network traffic pattern indicates the customer organization currently subscribes to three endpoints in three different regions that serve end users from five geographic regions. The user selects each endpoint in turn and a network traffic heatmap associated with the network traffic of end users to and from the selected endpoint is displayed using color coded lines, as well as network traffic charts as described herein.

The user notices that some of the network traffic being served by one of the endpoints is from end users that are in a geographically distant region and the latency for those end users is unacceptably high. In this example, the high latency is illustrated by red lines between the end users' locations and the endpoint, making it easy for the user to notice the high latency pattern.

The user then interacts with the network traffic manager application to request to access an endpoint recommendation to improve the performance of the customer organization. In response to the request, the network traffic manager automatically provides a generated endpoint recommendation. At defined intervals, in order to generate and maintain an endpoint recommendation for the customer, the network traffic manager collects current network traffic data from the customer organization, other customers, and/or endpoints as described herein. The data traffic patterns of the customer organization and other customers may then be generated and/or updated based on the collected current network traffic data. the network traffic manager further generates network behavior estimates associated with the customers and endpoints of the network using machine learning. Performance scores associated with the customers, endpoints, and other network entities are calculated as described herein.

Based on the data traffic patterns and performance scores, the network traffic manager generates an endpoint recommendation, which is then provided to the user. The endpoint recommendation includes a recommendation of establishing an endpoint in the geographically distant region mentioned above.

Later, after the recommended endpoint has been added to the customer's configuration, the user returns to the network traffic manager and selects to view the visualization again. The network traffic pattern of the customer organization is overlaid on the geometric map interface, including network traffic data associated with the newly established endpoint. The user selects the new endpoint and the associated network traffic data is displayed in the form of a heatmap around the endpoint. The user determines that adding the new endpoint did improve the performance of the customer organization's network as predicted by the network traffic manager.

Exemplary Operating Environment

Figure 5:
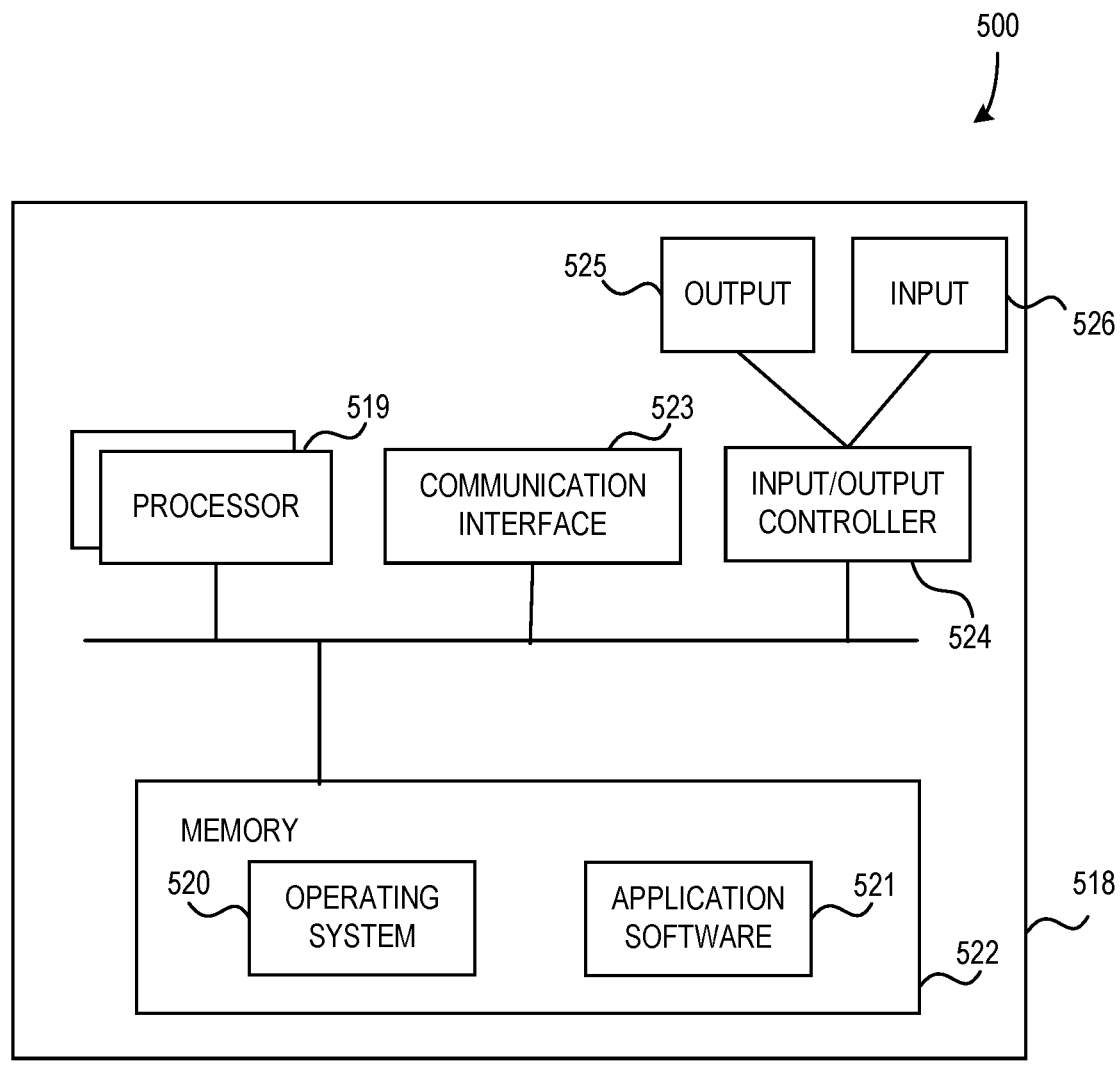
FIG. 5 illustrates a computing apparatus according to an embodiment as a functional block diagram.

The present disclosure is operable with a computing apparatus according to an embodiment as a functional block diagram 500 in FIG. 5. In an embodiment, components of a computing apparatus 518 may be implemented as a part of an electronic device according to one or more embodiments described in this specification. The computing apparatus 518 comprises one or more processors 519 which may be microprocessors, controllers or any other suitable type of processors for processing computer executable instructions to control the operation of the electronic device. Alternatively, or in addition, the processor 519 is any technology capable of executing logic or instructions, such as a hard-coded machine. Platform software comprising an operating system 520 or any other suitable platform software may be provided on the apparatus 518 to enable application software 521 to be executed on the device. According to an embodiment, analyzing network traffic data to generate network traffic patterns, display the generated patterns as visualizations, and generate endpoint recommendations based on the network traffic patterns as described herein may be accomplished by software.

Computer executable instructions may be provided using any computer-readable media that are accessible by the computing apparatus 518. Computer-readable media may include, for example, computer storage media such as a memory 522 and communications media. Computer storage media, such as a memory 522, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 522) is shown within the computing apparatus 518, it will be appreciated by a person skilled in the art, that the storage may be distributed or located remotely and accessed via a network or other communication link (e.g. using a communication interface 523).

The computing apparatus 518 may comprise an input/output controller 524 configured to output information to one or more output devices 525, for example a display or a speaker, which may be separate from or integral to the electronic device. The input/output controller 524 may also be configured to receive and process an input from one or more input devices 526, for example, a keyboard, a microphone or a touchpad. In one embodiment, the output device 525 may also act as the input device. An example of such a device may be a touch sensitive display. The input/output controller 524 may also output data to devices other than the output device, e.g. a locally connected printing device. In some embodiments, a user may provide input to the input device(s) 526 and/or receive output from the output device(s) 525.

The functionality described herein can be performed, at least in part, by one or more hardware logic components. According to an embodiment, the computing apparatus 518 is configured by the program code when executed by the processor 519 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

Alternatively, or in addition to the other examples described herein, examples include any combination of the following:

A system for selecting an endpoint within a network to reduce latency, the system comprising:
at least one processor; and
at least one memory communicatively coupled to the at least one processor and comprising computer program code, the at least one memory and the computer program code configured to, with the at least one processor, cause the at least one processor to:
collect latency data associated with accessing a first endpoint within a network by a plurality of end user devices from a plurality of geographic regions, the plurality of end user devices being associated with a plurality of customers;
calculate performance scores for the plurality of geographic regions based at least on the collected latency data;
select a subset of the calculated performance scores based on network traffic of end user devices of one of the plurality of customers, the network traffic originating from one or more of the plurality of geographic regions;
identify, based on the selected subset of the performance scores and a volume of the network traffic from the one or more of the plurality of geographic regions, a second endpoint within the network for the one of the plurality of customers; and
establish, within the network for the one of the plurality of customers, the second endpoint for the network traffic originating from the one or more of the plurality of geographic regions to reduce latency.
wherein the at least one memory and the computer program code are configured to, with the at least one processor, cause the at least one processor to identify the second endpoint within the network for the one of the plurality of customers by:
identifying a high latency geographic region from the plurality of geographic regions based on the selected subset of the performance scores and the volume of the network traffic from the identified high latency geographic region;
identifying a plurality of endpoints located in the identified high latency geographic region; and
selecting, based on the collected latency data, the second endpoint from the identified plurality of endpoints, the second endpoint having a low latency when accessing the first endpoint from the high latency geographic region.
wherein the at least one memory and the computer program code are configured to, with the at least one processor, further cause the at least one processor to select the second endpoint based on a type of the network traffic from the identified high latency geographic region, the type of the network traffic including one or more of the following: web browsing traffic, video streaming traffic, voice over Internet Protocol (IP) traffic, and file transfer traffic.
wherein the at least one memory and the computer program code are configured to, with the at least one processor, further cause the at least one processor to:
generate a geographic map interface with the plurality of geographic regions, the geographic map interface indicating the calculated performance scores associated with the plurality of geographic regions.
wherein the at least one memory and the computer program code are configured to, with the at least one processor, further cause the at least one processor to:
indicate the identified second endpoint on the geographic map interface.
wherein the at least one memory and the computer program code are configured to, with the at least one processor, further cause the at least one processor to:
input the collected latency data into a machine learning module to predict latency estimates associated with accessing the first endpoint from the plurality of geographic regions, wherein identifying the second endpoint includes identifying the second endpoint based on the predicted latency estimates.
wherein the at least one memory and the computer program code are configured to, with the at least one processor, further cause the at least one processor to:
calculate predicted performance scores for the plurality of geographic regions using the identified second endpoint; and
compare the performance scores calculated based on the collected latency data with the predicted performance scores using the identified second endpoint to determine a projected performance improvement with the identified second endpoint.
A computerized method for selecting an endpoint within a network to reduce latency, the method comprising:
collecting, by a processor, latency data associated with accessing a first endpoint within a network by a plurality of end user devices from a plurality of geographic regions, the plurality of end user devices being associated with a plurality of customers;
calculating, by the processor, performance scores for the plurality of geographic regions based at least on the collected latency data;
selecting, by the processor, a subset of the calculated performance scores based on network traffic of end user devices of one of the plurality of customers, the network traffic originating from one or more of the plurality of geographic regions;
identifying, by the processor, based on the selected subset of the performance scores and a volume of the network traffic from the one or more of the plurality of geographic regions, a second endpoint within the network for the one of the plurality of customers; and
establishing, by the processor, within the network for the one of the plurality of customers, the second endpoint for the network traffic originating from the one or more of the plurality of geographic regions to reduce latency.
wherein identifying the second endpoint within the network for the one of the plurality of customers includes:

identifying a high latency geographic region from the plurality of geographic regions based on the selected subset of the performance scores and the volume of the network traffic from the identified high latency geographic region;

identifying a plurality of endpoints located in the identified high latency geographic region; and selecting, based on the collected latency data, the second endpoint from the identified plurality of endpoints, the second endpoint having a low latency when accessing the first endpoint.

wherein selecting the second endpoint comprises selecting the second endpoint based on a type of the network traffic from the identified high latency geographic region, the type of the network traffic including one or more of the following: web browsing traffic, video streaming traffic, voice over Internet Protocol (IP) traffic, and file transfer traffic.

further comprising generating a geographic map interface with the plurality of geographic regions, the geographic map interface indicating the calculated performance scores associated with the plurality of geographic regions.

further comprising indicating the identified second endpoint on the geographic map interface.

further comprising inputting the collected latency data into a machine learning module to predict latency estimates associated with accessing the first endpoint from the plurality of geographic regions, wherein identifying the second endpoint includes identifying the second endpoint based on the predicted latency estimates.

further comprising:

calculating predicted performance scores for the plurality of geographic regions using the identified second endpoint; and comparing the performance scores calculated based on the collected latency data with the predicted performance scores using the identified second endpoint to determine a projected performance improvement with the identified second endpoint.

One or more computer storage media having computer-executable instructions for selecting an endpoint within a network to reduce latency that, upon execution by a processor, cause the processor to at least:

collect latency data associated with accessing a first endpoint within a network by a plurality of end user devices from a plurality of geographic regions, the plurality of end user devices being associated with a plurality of customers;

calculate performance scores for the plurality of geographic regions based at least on the collected latency data;

select a subset of the calculated performance scores based on network traffic of end user devices of one of the plurality of customers, the network traffic originating from one or more of the plurality of geographic regions;

identify, based on the selected subset of the performance scores and a volume of the network traffic from the one or more of the plurality of geographic regions, a second endpoint within the network for the one of the plurality of customers; and establish, within the network for the one of the plurality of customers, the second endpoint for the network traffic originating from the one or more of the plurality of geographic regions to reduce latency.

wherein the computer-executable instructions further cause the processor to identify the second endpoint within the network for the one of the plurality of customers by:

identifying a high latency geographic region from the plurality of geographic regions based on the selected subset of the performance scores and the volume of the network traffic from the identified high latency geographic region;

identifying a plurality of endpoints located in the identified high latency geographic region; and selecting, based on the collected latency data, the second endpoint from the identified plurality of endpoints, the second endpoint having a low latency when accessing the first endpoint.

wherein the computer-executable instructions further cause the processor to select the second endpoint based on a type of the network traffic from the identified high latency geographic region, the type of the network traffic including one or more of the following: web browsing traffic, video streaming traffic, voice over Internet Protocol (IP) traffic, and file transfer traffic.

wherein the computer-executable instructions further cause the processor to generate a geographic map interface with the plurality of geographic regions, the geographic map interface indicating the calculated performance scores associated with the plurality of geographic regions.

wherein the computer-executable instructions further cause the processor to indicate the identified second endpoint on the geographic map interface.

wherein the computer-executable instructions further cause the processor to input the collected latency data into a machine learning module to predict latency estimates associated with accessing the first endpoint from the plurality of geographic regions, wherein identifying the second endpoint includes identifying the second endpoint based on the predicted latency estimates.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for collecting latency data associated with accessing a first endpoint within a network by a plurality of end user devices from a plurality of geographic regions, wherein the plurality of end user devices are associated with a plurality of customers; means for calculating performance scores for the plurality of geographic regions based at least on the collected latency data; means for selecting a subset of the calculated performance scores based on network traffic of end user devices of one of the plurality of customers, wherein the network traffic originates from one or more of the plurality of geographic regions; means for identifying a second endpoint within the network for the one of the plurality of customers based on the selected subset of the performance scores and volume of the network traffic from the one or more of the plurality of geographic regions; and means for establishing the second endpoint within the network for the one of the plurality customers for the network traffic originating from the one or more of the plurality of geographic regions to reduce latency. The illustrated one or more processors 519 together with the computer program code stored in memory 522 constitute exemplary processing means for analyzing network traffic data, generating network traffic patterns, and identifying endpoints for recommendation based on the network traffic analysis as described herein.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
    at least one processor; and
    at least one memory communicatively coupled to the at least one processor and comprising computer program code that, when executed by the at least one processor, cause the system to:
    for a plurality of originating IP subnets associated with a customer of a network service infrastructure, collect latency data associated with accessing a plurality of endpoints within the network by a plurality of end user devices associated with the customer, wherein the end user devices are clustered based on source address, footprint, and traffic analysis performed for the customer;
    calculate performance scores for a plurality of geographic regions based at least on the collected latency data and a load estimation model, wherein the geographic regions are associated with the customer and the geographic regions are determined based on a geography of the endpoints and a relative network location of the endpoints;
    generate a reduced set of IP subnets by eliminating subnets that have negligible traffic based on a traffic threshold;
    form associations between network traffic and the clustered end user devices;
    based on the associations, select a subset of the calculated performance scores based on the network traffic of end user devices of one of the reduced set of IP subnets;
    generate estimates of future network behavior for the network traffic for the one of the reduced set of IP subnets;
    compare one or more performance scores of the one of the reduced set of IP subnets to the generated estimates and one or more predefined performance score thresholds;
    identify, based on the comparison, the selected subset of the calculated performance scores, and a volume of the network traffic from the one or more of the plurality of geographic regions, an endpoint recommendation for improving the performance scores for the customer; and
    configure the network based on the endpoint recommendation.

2. The system of claim 1, wherein the computer program code, when executed by the at least one processor, cause the system to:
    identify a high latency geographic region from the plurality of geographic regions based on the selected subset of the calculated performance scores and the volume of the network traffic from the identified high latency geographic region;
    identify a plurality of endpoints located in the identified high latency geographic region; and
    select, based on the collected latency data, the endpoint recommendation from the identified plurality of endpoints, the endpoint recommendation having a low latency when accessing the endpoint from the high latency geographic region.

3. The system of claim 2, wherein the computer program code, when executed by the at least one processor, cause the system to select the endpoint recommendation based on a type of the network traffic from the identified high latency geographic region, the type of the network traffic including one or more of the following: web browsing traffic, video streaming traffic, voice over Internet Protocol (IP) traffic, and file transfer traffic.

4. The system of claim 1, wherein the computer program code, when executed by the at least one processor, cause the system to:

generate a geographic map interface with the plurality of geographic regions, the geographic map interface indicating the calculated performance scores associated with the plurality of geographic regions.

5. The system of claim 4, wherein the computer program code, when executed by the at least one processor, cause the system to:

indicate the identified endpoint recommendation on the geographic map interface.

6. The system of claim 1, wherein the computer program code, when executed by the at least one processor, cause the system to:

input the collected latency data into a machine learning module to predict latency estimates associated with accessing the endpoint from the plurality of geographic regions, wherein identifying the endpoint recommendation includes identifying the endpoint recommendation based on the predicted latency estimates.

7. The system of claim 1, wherein the computer program code, when executed by the at least one processor, cause the system to:

estimate performance scores for the plurality of geographic regions using the identified endpoint recommendation; and compare the performance scores calculated based on the collected latency data with the estimated performance scores using the identified endpoint recommendation to determine a projected performance improvement with the identified endpoint recommendation.

8. A computerized method for selecting an endpoint to reduce latency within a network service infrastructure configured to provide computing services to end users of customers of the network service infrastructure, the method comprising:

for a plurality of originating IP subnets associated with a customer of the network service infrastructure, collecting, by a computing device of the network service infrastructure, latency data associated with accessing a plurality of endpoints within the network by a plurality of end user devices associated with the customer, wherein the end user devices are clustered based on source address, footprint, and traffic analysis performed for the customer;

calculating, by the computing device, performance scores for a plurality of geographic regions based at least on the collected latency data and a load estimation model, wherein the geographic regions are associated with the customer and the geographic regions are determined based on a geography of the endpoints and a relative network location of the endpoints;

generating a reduced set of IP subnets by eliminating subnets that have negligible traffic based on a traffic threshold;

forming associations between network traffic and the clustered end user devices;

based on the associations, selecting, by the computing device, a subset of the calculated performance scores based on the network traffic of end user devices of one of the reduced set of IP subnets;

generating estimates of future network behavior for the network traffic for the one of the reduced set of IP subnets;

comparing one or more performance scores of the one of the reduced set of IP subnets to the generated estimates and one or more predefined performance score thresholds;

identifying, by the computing device, based on the comparison, the selected subset of the calculated performance scores, and a volume of the network traffic from the one or more of the plurality of geographic regions, an endpoint recommendation for improving the performance scores for the customer; and configuring, by the computing device, the network based on the endpoint recommendation.

9. The computerized method of claim 8, wherein identifying the endpoint recommendation comprises:

identifying a high latency geographic region from the plurality of geographic regions based on the selected subset of the calculated performance scores and the volume of the network traffic from the identified high latency geographic region;

identifying a plurality of endpoints located in the identified high latency geographic region; and selecting, based on the collected latency data, the endpoint recommendation from the identified plurality of endpoints, the endpoint recommendation having a low latency when accessing the endpoint.

10. The computerized method of claim 9, wherein selecting the endpoint recommendation comprises selecting the endpoint recommendation based on a type of the network traffic from the identified high latency geographic region, the type of the network traffic including one or more of the following: web browsing traffic, video streaming traffic, voice over Internet Protocol (IP) traffic, and file transfer traffic.

11. The computerized method of claim 8, further comprising:

generating a geographic map interface with the plurality of geographic regions, the geographic map interface indicating the calculated performance scores associated with the plurality of geographic regions.

12. The computerized method of claim 11, further comprising:

indicating the identified endpoint recommendation on the geographic map interface.

13. The computerized method of claim 8, further comprising:

inputting the collected latency data into a machine learning module to predict latency estimates associated with accessing the endpoint from the plurality of geographic regions, wherein identifying the endpoint recommendation includes identifying the endpoint recommendation based on the predicted latency estimates.

14. The computerized method of claim 8, further comprising:

estimating performance scores for the plurality of geographic regions using the identified endpoint recommendation; and comparing the performance scores calculated based on the collected latency data with the estimated performance scores using the identified endpoint recommendation to determine a projected performance improvement with the identified endpoint recommendation.

15. One or more computer storage media having computer-executable instructions that, when executed by a processor of a computing device, cause the computing device to at least:

for a plurality of originating IP subnets associated with a customer of a network service infrastructure, collect latency data associated with accessing a plurality of endpoints within the network by a plurality of end user devices associated with the customer, wherein the end user devices are clustered based on source address, footprint, and traffic analysis performed for the customer;

calculate performance scores for a plurality of geographic regions based at least on the collected latency data and a load estimation model, wherein the geographic regions are associated with the customer and the geographic regions are determined based on a geography of the endpoints and a relative network location of the endpoints;

generate a reduced set of IP subnets by eliminating subnets that have negligible traffic based on a traffic threshold;

form associations between network traffic and the clustered end user devices;

based on the associations, select a subset of the calculated performance scores based on the network traffic of end user devices of one of the reduced set of IP subnets;

generate estimates of future network behavior for the network traffic for the one of the reduced set of IP subnets;

compare one or more performance scores of the one of the reduced set of IP subnets to the generated estimates and one or more predefined performance score thresholds;

identify, based on the comparison, the selected subset of the calculated performance scores, and a volume of the network traffic from the one or more of the plurality of geographic regions, an endpoint recommendation for improving the performance scores for the customer; and configure the network based on the endpoint recommendation.

16. The one or more computer storage media of claim 15, wherein the computer-executable instructions further cause the computing device to:

identify a high latency geographic region from the plurality of geographic regions based on the selected subset of the calculated performance scores and the volume of the network traffic from the identified high latency geographic region;

identify a plurality of endpoints located in the identified high latency geographic region; and select, based on the collected latency data, the endpoint recommendation from the identified plurality of endpoints, the endpoint recommendation having a low latency when accessing the endpoint.

17. The one or more computer storage media of claim 16, wherein the computer-executable instructions further cause the computing device to select the endpoint recommendation based on a type of the network traffic from the identified high latency geographic region, the type of the network traffic including one or more of the following: web browsing traffic, video streaming traffic, voice over Internet Protocol (IP) traffic, and file transfer traffic.

18. The one or more computer storage media of claim 15, wherein the computer-executable instructions further cause the computing device to:

generate a geographic map interface with the plurality of geographic regions, the geographic map interface indicating the calculated performance scores associated with the plurality of geographic regions.

19. The one or more computer storage media of claim 18, wherein the computer-executable instructions further cause the computing device to:

indicate the identified endpoint recommendation on the geographic map interface.

20. The one or more computer storage media of claim 15, wherein the computer-executable instructions further cause the computing device to:

input the collected latency data into a machine learning module to predict latency estimates associated with accessing the endpoint from the plurality of geographic regions, wherein identifying the endpoint recommendation includes identifying the endpoint recommendation based on the predicted latency estimates.

* * * * *